US012565003B2

(12) United States Patent
Plummer et al.

(10) Patent No.: US 12,565,003 B2
(45) Date of Patent: Mar. 3, 2026

(54) TECHNIQUES FOR POWDER DELIVERY IN ADDITIVE FABRICATION AND RELATED SYSTEMS AND METHODS

(71) Applicant: Formlabs, Inc., Somerville, MA (US)

(72) Inventors: Luke Plummer, Jericho, VT (US); Maria Rosa Ruiz, Malden, MA (US); Carlos Ruiz-Vargas, Waltham, MA (US); Robert Morgan, Winchester, MA (US); Joseph Johnson, Norwood, MA (US); Gregory Connor Evans, Somerville, MA (US)

(73) Assignee: Formlabs, Inc., Somerville, MA (US)

( * ) Notice: Subject to any disclaimer, the term of this patent is extended or adjusted under 35 U.S.C. 154(b) by 321 days.

(21) Appl. No.: 18/191,227

(22) Filed: Mar. 28, 2023

(65) Prior Publication Data

US 2023/0311419 A1      Oct. 5, 2023

Related U.S. Application Data

(60) Provisional application No. 63/326,493, filed on Apr. 1, 2022.

(51) Int. Cl.
B29C 64/343      (2017.01)
B29C 64/329      (2017.01)
(Continued)

(52) U.S. Cl.
CPC .......... B29C 64/343 (2017.08); B29C 64/329 (2017.08); B29C 64/393 (2017.08);
(Continued)

(58) Field of Classification Search
CPC ... B29C 64/153; B29C 64/165; B29C 64/321; B29C 64/329; B29C 64/343; B65G 65/46; B65G 65/463
See application file for complete search history.

(56) References Cited

U.S. PATENT DOCUMENTS 4,863,538 A     9/1989   Deckard
11,685,118 B2   6/2023   Plummer et al.
(Continued)

FOREIGN PATENT DOCUMENTS

WO      WO 2018/056988 A1     3/2018
WO      WO 2019/097256 A1     5/2019

OTHER PUBLICATIONS

International Search Report and Written Opinion dated Sep. 16, 2021 for International Application No. PCT/US2021/033577.

*Primary Examiner* — Atul P. Khare
(74) *Attorney, Agent, or Firm* — Michael J. Attisha; Greenberg Traurig, LLP

(57) ABSTRACT

Techniques are described for consistently moving powder from a hopper into a trough for subsequent delivery into a build area of an additive fabrication system. A powder conveyer may be arranged at least partially within the hopper and configured to be actuated to transfer powder to the trough. The powder conveyer may be formed as a screw conveyer, for example. Such techniques do not require complex closed-loop control systems and may be effective irrespective of the flowability of the powder. In at least some cases, there may be no production of excess powder because the amount of powder that is metered into the trough may be precisely controlled to be the amount needed for recoating.

20 Claims, 18 Drawing Sheets

(51) Int. Cl.
  *B29C 64/393*    (2017.01)
  *B33Y 30/00*    (2015.01)
  *B33Y 40/00*    (2020.01)
  *B33Y 50/02*    (2015.01)
  *B65G 65/46*    (2006.01)

(52) U.S. Cl.
  CPC ............... *B33Y 30/00* (2014.12); *B33Y 40/00*
      (2014.12); *B33Y 50/02* (2014.12); *B65G 65/46*
            (2013.01); *B65G 65/463* (2013.01)

(56)              References Cited

U.S. PATENT DOCUMENTS 12,194,681 B2 *   1/2025  Karlsson ............... B29C 64/343
  2008/0230414 A1    9/2008  Perret et al.
  2020/0307074 A1 *  10/2020  Tjellesen ............ B01F 27/1121
  2021/0362419 A1    11/2021  Plummer et al.

* cited by examiner

1000

TECHNIQUES FOR POWDER DELIVERY IN ADDITIVE FABRICATION AND RELATED SYSTEMS AND METHODS

CROSS-REFERENCE TO RELATED APPLICATIONS

The present application claims the benefit under 35 U.S.C. § 119(e) of U.S. Provisional Patent Application No. 63/326,493, filed Apr. 1, 2022, titled "Techniques for Powder Delivery in Additive Fabrication and Related Systems and Methods," which is hereby incorporated by reference in its entirety.

BACKGROUND

Additive fabrication, e.g., 3-dimensional (3D) printing, provides techniques for fabricating objects (also referred to as "parts") by causing portions of a building material to solidify at specific locations. Additive fabrication techniques may include stereolithography, selective or fused deposition modeling, direct composite manufacturing, laminated object manufacturing, selective phase area deposition, multiphase jet solidification, ballistic particle manufacturing, particle deposition, selective laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as selective laser sintering, or "SLS," solid objects are created by successively forming thin layers by selectively fusing together powdered material. One illustrative description of selective laser sintering may be found in U.S. Pat. No. 4,863,538, incorporated herein in its entirety by reference.

SUMMARY

According to some aspects, a powder delivery apparatus for an additive fabrication system is provided, the powder delivery apparatus comprising a hopper configured to hold a powder, a trough adjacent to a build area of the additive fabrication system and arranged to receive powder from the hopper, a powder conveyor arranged at least partially within the hopper and configured to convey powder from the hopper into the trough, an electro-optical sensor configured to produce at least one signal indicative of a level of the powder in the trough, and at least one processor configured to control motion of the powder conveyor based on the at least one signal produced by the electro-optical sensor to control the level of the powder in the trough.

According to some aspects, a powder delivery apparatus for an additive fabrication system is provided, the powder delivery apparatus comprising a hopper configured to hold a powder, a trough adjacent to a build area of the additive fabrication system and arranged above the hopper, wherein the hopper is arranged to receive powder overflowing from the trough, a regulating device configured to deliver powder from the trough to the build area of the additive fabrication system, and a powder conveyor arranged at least partially within the hopper and configured to convey powder from the hopper into the trough.

According to some aspects, a powder delivery apparatus for an additive fabrication system is provided, the powder delivery apparatus comprising a hopper configured to hold a powder, a trough adjacent to a build area of the additive fabrication system and arranged to receive powder from the hopper, a regulating device configured to deliver powder in the trough to the build area of the additive fabrication system, and at least one processor configured to measure a level of powder in the trough by measuring a force applied to the regulating device during its motion through the trough.

According to some aspects, a powder delivery apparatus for an additive fabrication system is provided, the powder delivery apparatus comprising a hopper configured to hold a powder, a recoater including two segments and configured to enclose a powder volume between the two segments, a powder transfer mechanism for moving powder from the hopper to the recoater, and a sensor to measure an amount of volume enclosed between the two segments of the recoater.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
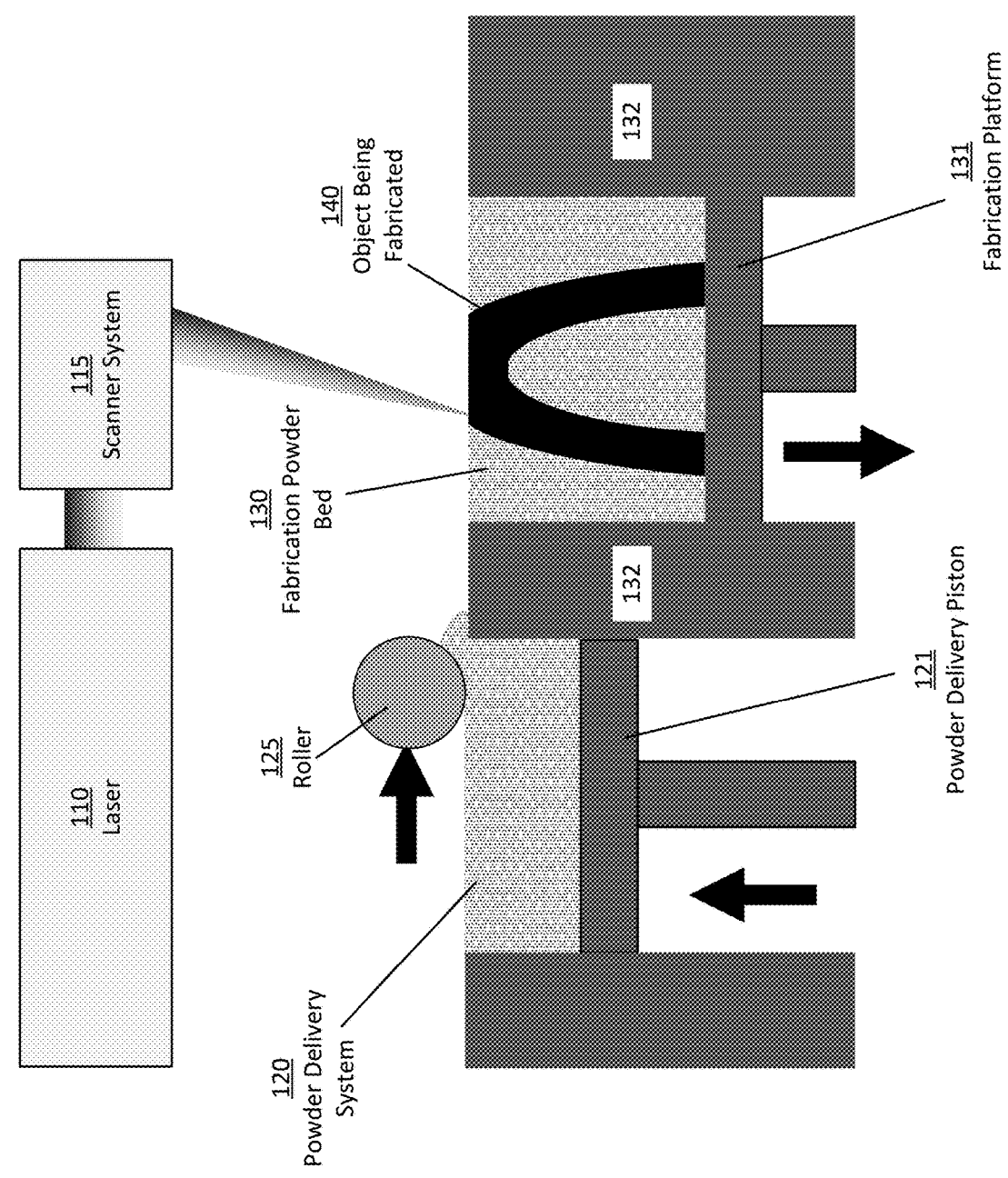
FIG. 1 depicts an illustrative conventional SLS additive fabrication device.

An illustrative conventional SLS additive fabrication device is illustrated in FIG. 1. In the example of FIG. 1, SLS device 100 comprises a laser 110 paired with a computer-controlled scanner system 115 disposed to operatively aim the laser 110 at the fabrication bed 130 and move over the area corresponding to a given cross-sectional area of a computer aided design (CAD) model representing a desired part. Suitable scanning systems may include one or more mechanical gantries, linear scanning devices using polygonal mirrors, and/or galvanometer-based scanning devices.

In the example of FIG. 1, the material in the fabrication bed 130 is selectively heated by the laser in a manner that causes the powder material particles to fuse (sometimes also referred to as "sintering" or "consolidating") such that a new layer of the object 140 is formed. SLS is suitable for use with many different powdered materials, including any of various forms of powdered nylon. In some cases, areas around the fabrication bed (e.g., the walls 132, the platform 131, etc.) may include heating elements to heat the powder in the fabrication bed. Such heaters may be used to preheat unconsolidated material, as described above, prior to consolidation via the laser.

Once a layer has been successfully formed, the fabrication platform 131 may be lowered a predetermined distance by a motion system (not pictured in FIG. 1). Once the fabrication platform 131 has been lowered, the recoater 125 (e.g., a roller in FIG. 1) may be moved across the fabrication bed 130, spreading a fresh layer of material across the fabrication bed 130 to be consolidated as described above. Mechanisms configured to apply a consistent layer of material onto the fabrication bed may include the use of wipers, rollers, blades, and/or other levelling mechanisms for moving material from a source of fresh material to a target location.

Since material in the powder bed 130 is typically only consolidated in certain locations by the laser, some material will generally remain within the bed in an unconsolidated state. This unconsolidated material is sometimes referred to as a "part cake." In some embodiments, the part cake may be used to physically support features such as overhangs and thin walls during the formation process, allowing for SLS systems to avoid the use of temporary mechanical support structures, such as may be used in other additive manufacturing techniques such as stereolithography. In addition, this may further allow parts with more complicated geometries, such as moveable joints or other isolated features, to be printed with interlocking but unconnected components.

The above-described process of producing a fresh layer of powder and consolidating material using the laser repeats to form an object layer-by-layer until the entire object has been fabricated. Once the object has been fully fabricated, the object and the part cake may be cooled at a controlled rate to limit issues that may arise with fast cooling, such as warping or other distortion due to variable rate cooling. The object and part cake may be cooled while within the selective laser sintering apparatus, or removed from the apparatus after fabrication to continue cooling. Once fully cooled, the object can be separated from the part cake by a variety of methods. The unused material in the part cake may optionally be recycled for use in subsequent fabrication.

In some conventional systems, the process of repeatedly depositing a layer of powder into the build area may rely upon complex closed-loop control systems that include sensors for carefully metering out the amount of powder needed to precisely cover the build area at a constant depth. Some other conventional systems simply provide more powder than is needed and catch the excess in an overflow or catch bin. In the case of closed-loop control, the additive fabrication system requires complex electronics that are capable of operating in a high temperature environment, whereas in the case of catching overflow, the system requires additional space for the overflow bin, and can be wasteful because excess powder is produced.

Figure 2A:
FIGS. 2A-2C depict a process of powder delivery in a conventional system that relies on an overflow bin.
Figure 2A:
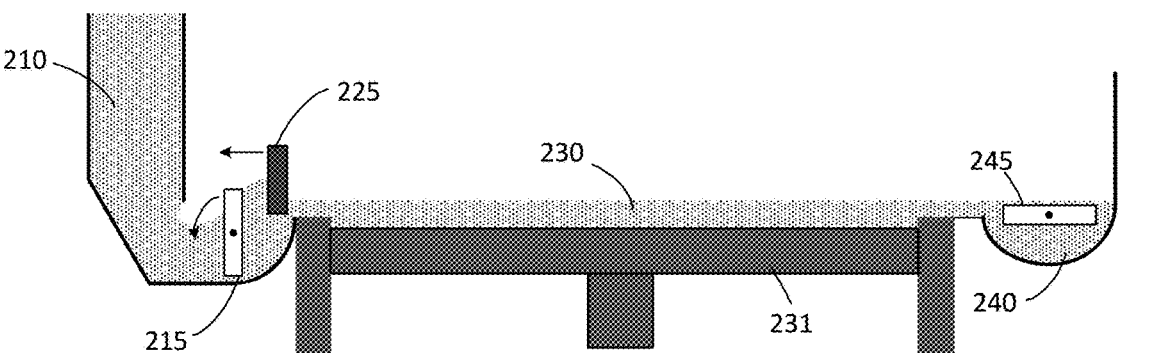
Figure 2B:
Figure 2B:
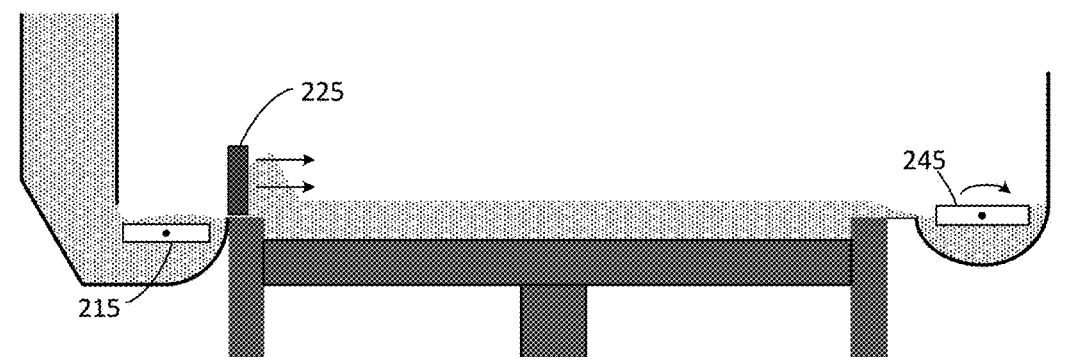
Figure 2C:
Figure 2C:
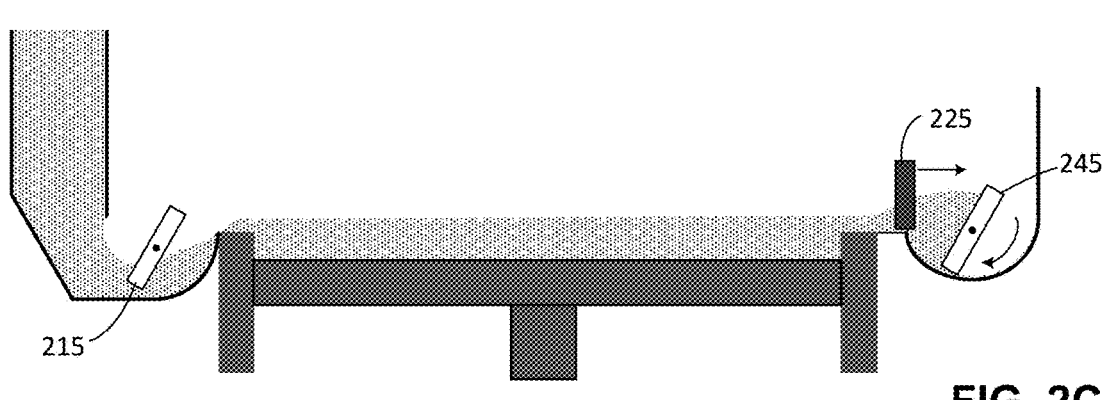

For purposes of further explanation, FIGS. 2A-2C depict a process of powder delivery in a conventional system that relies on an overflow bin. As shown in FIG. 2A, additive fabrication system 200 comprises a hopper 210 containing powder that is to be deposited over the powder bed 230, the top of which represents the build area and is arranged over build platform 231. Gravity causes the powder in hopper 210 to settle into a pile at the bottom of the hopper, which includes a flipper 215 that can rotate to push up powder from the bottom of this pile. The system also includes a recoater 225 that can move back and forth over the build area and, in the example of FIG. 2A-2B, can push powder pushed up by flipper 215 onto the build area. In some embodiments, the hopper 402 includes opposing angled sides (e.g., the top of the hopper is larger than the bottom of the hopper).

Any excess powder that is not deposited onto the powder bed 230 (e.g., because the recoater is configured to create a layer of powder with a fixed height, and more powder than was needed to create this layer was pushed away from the hopper 210) is pushed into a trough 240 which includes flipper 245. This powder can be reused for subsequent recoating operations by operating flipper 245 to push up powder for the recoater to push over the build area, as shown in FIG. 2C.

In some cases, there may be a hopper on both sides, but irrespective of whether there are two or one hoppers, the powder delivery method depicted by FIGS. 2A-2C has a drawback that powders that are have low flowability (e.g., low angle of repose), and/or have inconsistent flowability are difficult to accurately and consistently meter out from the hopper. For instance, if the powder flow is too low, there may be a shortage of powder deposited over the build area, thereby leading to powder being compacted within the flippers 215 and/or 245 and/or within the pile of powder at the bottom of the hopper.

The inventors have recognized and appreciated techniques for consistently moving powder from a hopper into a trough for subsequent delivery into a build area of an additive fabrication system. A powder conveyer may be arranged at least partially within the hopper and configured to be actuated to transfer powder to the trough. The powder conveyer may be formed as a screw conveyer, for example. Such techniques do not require complex closed-loop control systems and may be effective irrespective of the flowability of the powder. Moreover, in at least some cases, there may be no production of excess powder because the amount of powder that is metered into the trough may be precisely controlled to be the amount needed for recoating.

According to some embodiments, an additive fabrication device may comprise a powder delivery apparatus that comprises a hopper and a trough. Powder may be delivered into the trough from the hopper via a screw-based powder delivery system, such as via a helical transport mechanism that can be rotated about a screw axis to transport powder from the trough into the hopper. In some embodiments, a screw-based powder delivery system may be partially arranged within the hopper, which is arranged below the trough, so that powder can be transported upwards from the hopper into the trough.

Comparing to other powder delivery systems, screw-based powder delivery systems may offer architectural flexibility and allow a powder storage hopper to be mounted at a variety of locations within the SLS additive fabrication device. As a result, the hopper can be placed below the trough of the SLS device, and in some cases may be decoupled from a powder cartridge that loads powder into the additive fabrication device. Screw-based powder delivery systems can also be easily removed from a drivetrain or other mechanism used to actuate the screw, and therefore allow the screw to be replaced with a different screw for different powder materials.

Following below are more detailed descriptions of various concepts related to, and embodiments of, techniques for moving powder from a hopper into a trough for subsequent delivery into a build area of an additive fabrication system. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Figure 3A:
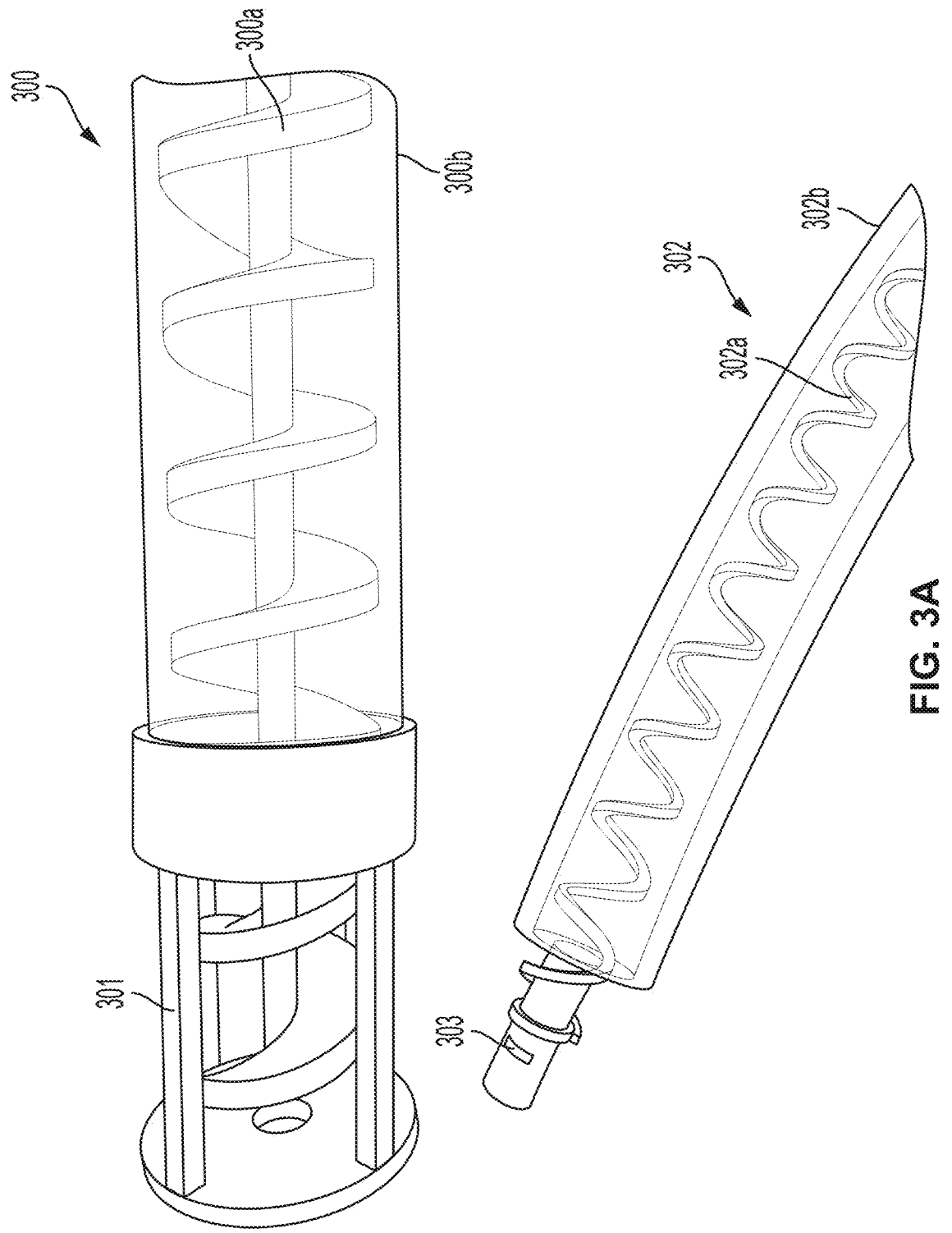
FIGS. 3A-3C depict illustrative powder delivery devices, according to some embodiments.

FIG. 3A is a photograph of two illustrative powder delivery screw conveyors, including a rigid screw conveyor 300 and a flexible screw conveyor 302, according to some embodiments. In the example of FIG. 3A, the rigid screw conveyor 300 includes a hard outer shell 300b (e.g., plastic) and a rigid screw 300a arranged inside the hard outer shell 300b. As shown in FIG. 3A, a lower portion 301 of the rigid screw 300a extends outside of the outer shell 300b and is housed within a rigid cage. This portion of the rigid screw conveyor 300 may be arranged within a volume of powder (e.g., in a hopper) and the rigid screw 300a actuated to rotate about its axis to take in powder through the rigid cage, and be carried through the outer shell 300b to a desired location (e.g., a trough).

In the example of FIG. 3A, flexible screw conveyor 302 includes a soft outer shell 302b and a flexible screw 302a placed inside the soft outer shell 302b. As shown in FIG. 3A, a lower portion 303 of the flexible screw 302a extends outside of the outer shell 302b. This portion of the flexible screw conveyor 302 may be arranged within a volume of powder (e.g., in a hopper) and the flexible screw 302a actuated to rotate about its axis to carry powder through the outer shell 302b to a desired location (e.g., a trough).

As a result, both rigid screw conveyor 300 and flexible screw conveyor 302 can be used for moving powder between two designated locations (e.g., from a hopper to a trough of an SLS device) by operating the respective screws 300a and 302a to rotate around a central axis. Unlike the rigid screw 300a, the flexible screw 302a does not include a fixed central shaft and therefore can be bent at various angles for additional architectural flexibility.

As may be noted, both screws 300a and 302 have a helical shape, and therefore may convey material when the helical shape is rotated about its central axis, either upwards or downward depending on the direction of rotation and the spiral direction of the helix. During conveyance in this manner, the material may sit on threads of the screw.

In some embodiments, bearings are arranged at either or both ends of the rigid screw 300a or the flexible screw 302a, allowing one or more actuators to be coupled to the respective screws, which may be actuated to produce rotation of the respective screw to convey powder. For instance, a bearing at the top or bottom of a screw may be coupled to a stepper motor which, when operated, rotates the screw by turning the bearing. The geometry of the screws may affect the rate at which screw conveyors delivery powder, including the type of flight (e.g., single v. double), the screw diameter, the pitch, the blade thickness, etc.

Figure 3C:
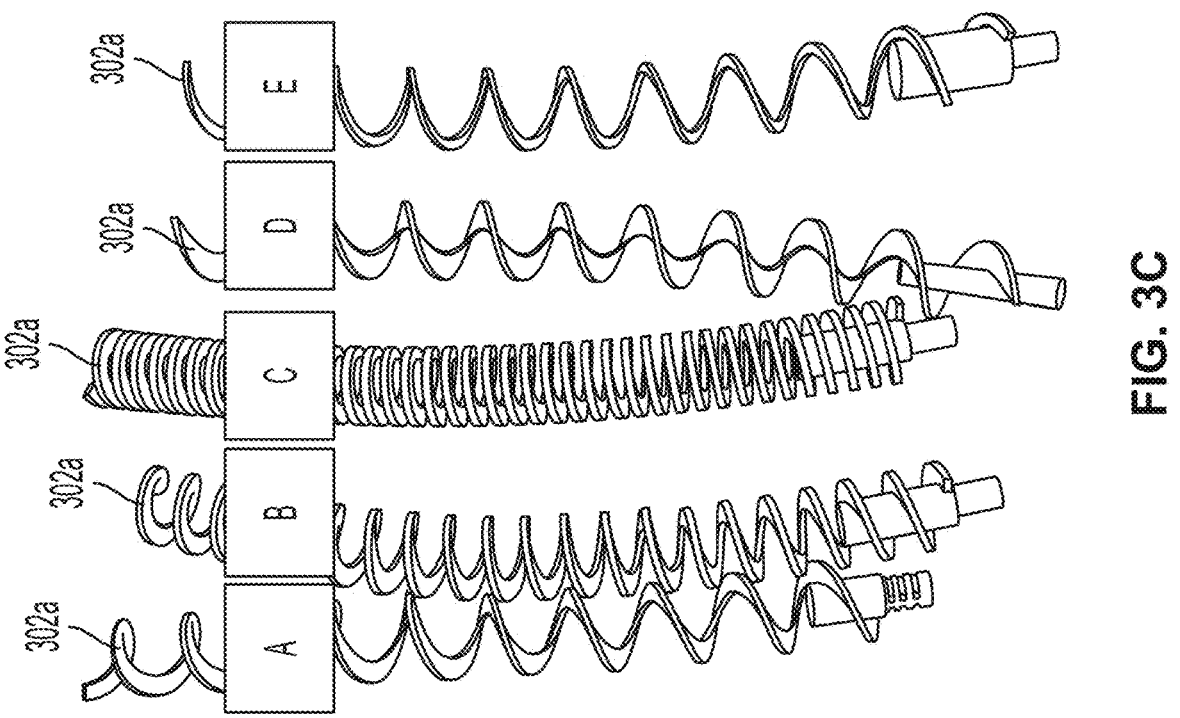
Figure 3B:
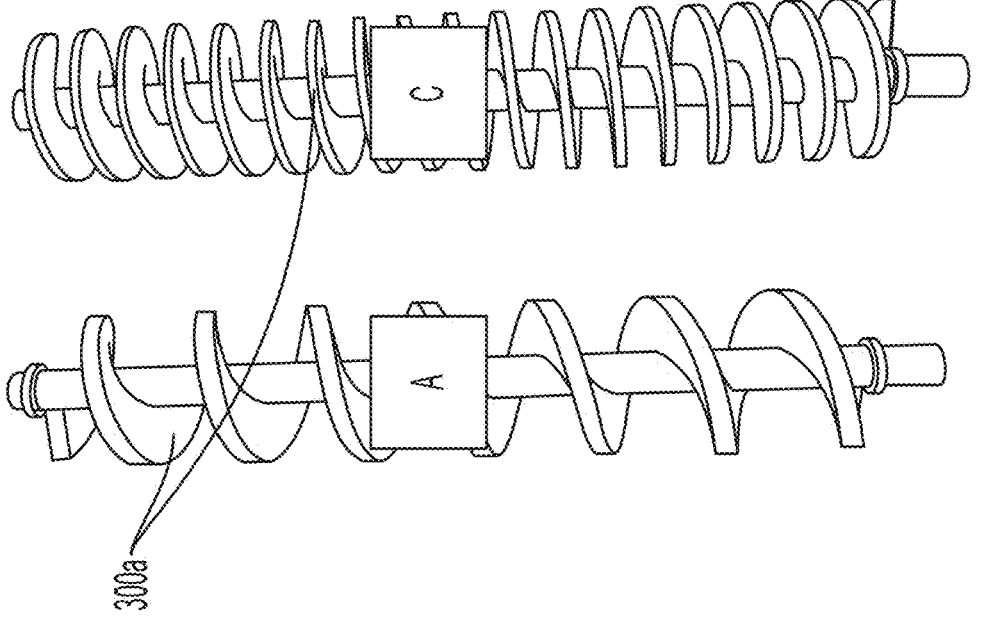

FIGS. 3B and 3C depict illustrative examples of rigid screws 300a and flexible screws 302a, respectively, according to some embodiments. As shown in FIGS. 3B-3C, some screws suitable for powder conveyance, whether a rigid or flexible screw, may have a helical or other suitable spiral shape. Screws may be helically symmetric about a screw axis—that is, the screw may be in the same configuration before and after being rotated about the screw axis by a suitable amount. In general, however, any shape that, when rotated about an axis, produces a linear motion may be utilized as a powder delivery screw conveyor as described herein.

In the example of FIG. 3B, rigid screws 300a include a central shaft along the helical axis of the screw. This shaft may aid in providing the screw with rigidity. In the example of FIG. 3C, flexible screws 302a may be noted not to include a central shaft, as noted above, unlike the example rigid screws 300a. It may be appreciated that terms like "rigid" and "flexible" are relative terms and do not necessarily convey a requirement for screws to have a particular degree of flexibility or rigidity. However, these terms are used herein for purposes of comparison between different embodiments.

FIGS. 4A-4E depict a illustrative powder delivery and regulating systems for an SLS additive fabrication device (e.g., the SLS device 100 shown in FIG. 1). The powder delivery and regulating systems 401a and 401b each includes a screw conveyor 400 for delivering powder 404 from a hopper 402 to a trough 406 of an SLS device. While a screw is not shown within the screw conveyor 400 in the example of FIGS. 4A-4E, this component may include a rigid or a flexible screw within the shell depicted in the drawings, and therefore may comprise a rigid screw conveyor (e.g., rigid screw conveyor 300 in FIG. 3A) or a flexible screw conveyor (e.g., flexible screw conveyor 302 in FIG. 3A).

As shown in FIGS. 4A-4D, one end of the screw conveyor 400 is arranged above the powder 404, with the other end of the screw conveyor being arranged within the hopper 402. In some embodiments, one or both ends of the screw conveyor may be connected to one or more actuators configured to rotate the screws (e.g., via a bearing) within the screw conveyor, and to thereby convey powder 404 from the bottom to the top of the screw conveyor 400.

One challenge for system 401a and 401b is to regulate the amount of powder within the trough 406. Recoater 410 is configured to move laterally across the build platform 412 to spread a layer of powder of predetermined height. To achieve consistent layer height for the powder spread, it is desirable that the amount of powder inside the trough 406 stays constant or substantially constant. During fabrication, the flipper 408 is configured to rotate within the trough 406 to push a portion of the powder out of the trough 406 and over the build platform 412, so that the recoater 410 can push this powder across the build platform 412 so that solid layers can be formed from this powder, as described above (e.g., by directing a laser onto selected regions of the powder).

Figures 4A, 4B:
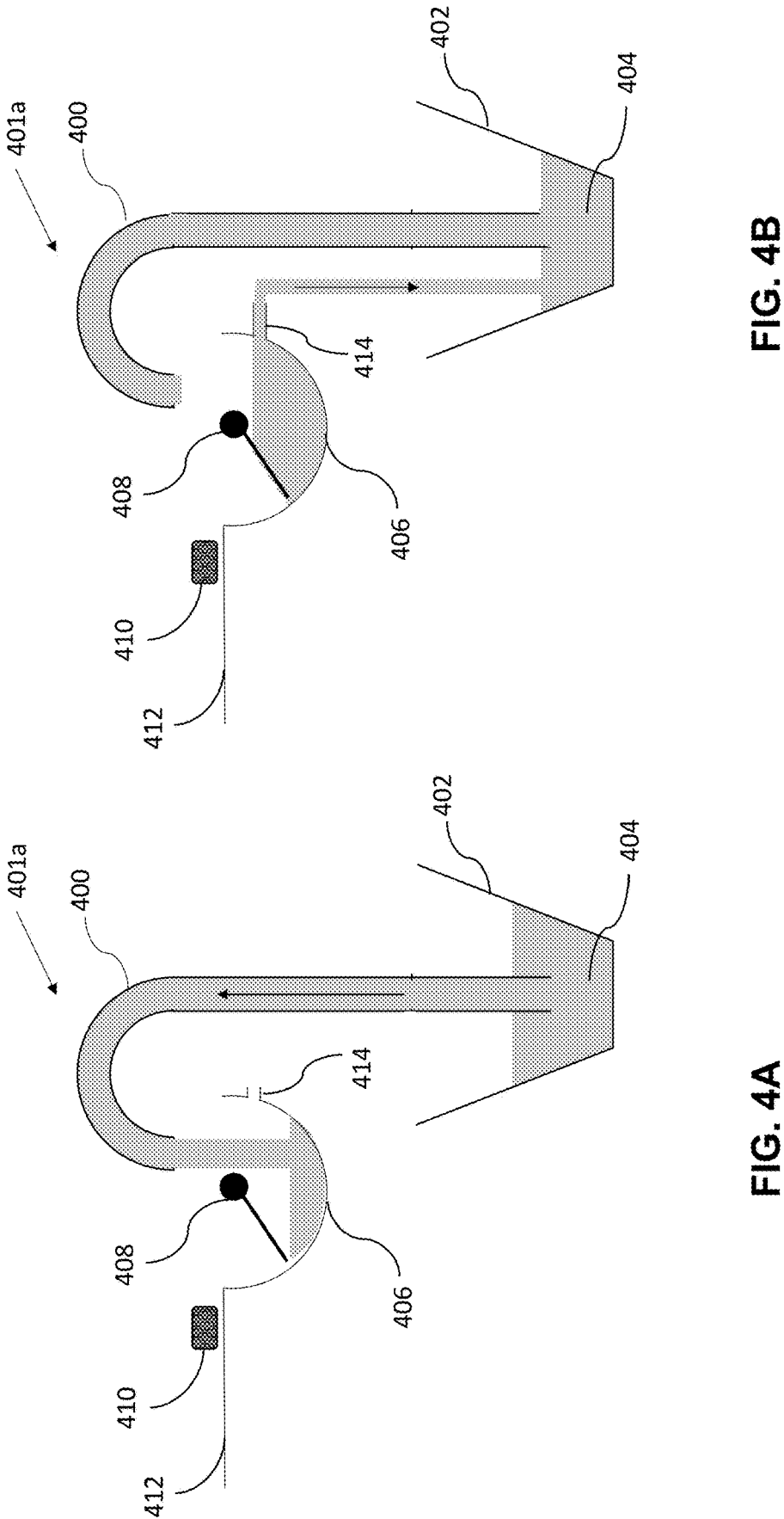
FIGS. 4A-4E depict a first illustrative powder delivery and regulating system for an SLS additive fabrication device, according to some embodiments.

In some embodiments, as shown in FIGS. 4A-4B, system 401a comprises a trough 406 that includes an overflow port 414 that is designed to keep the amount of powder 404 within the trough 406 constant once it has reached a particular level. As the screw conveyor 400 is operated to fill the trough 406 with powder 404, the height of the powder 404 inside the trough increases till it reaches the level of the overflow port 414. Next, as the screw conveyor 400 continues to pour powder 404 into the trough 406, the overflow port 414 allows the extra powder to leave the trough 406 and return into the hopper 402. The inflow into, and outflow from, the trough 406 due to the screw conveyor and overflow port, respectively, may reach an equilibrium so that at this point the level of powder in the trough is constant. In some cases, depending on the relative rates of powder conveyance by the screw conveyor and the overflow port, the constant level may be situated above the overflow port within the trough.

In some embodiments, the hopper 402 is placed below the overflow port 414 to allow the return of the powder 404 from the trough 406. Further, the size of the overflow port 414 is determined based on the inflow rate of the screw conveyor 400 to ensure the outflow rate is not less than the maximum inflow rate.

In some embodiments, the trough 406 does not have a separate overflow port 414. Instead, the extra powder overflows when it fills the entirety of the trough 406 and falls back into the hopper 402 placed below the trough 406.

Figures 4C, 4D:
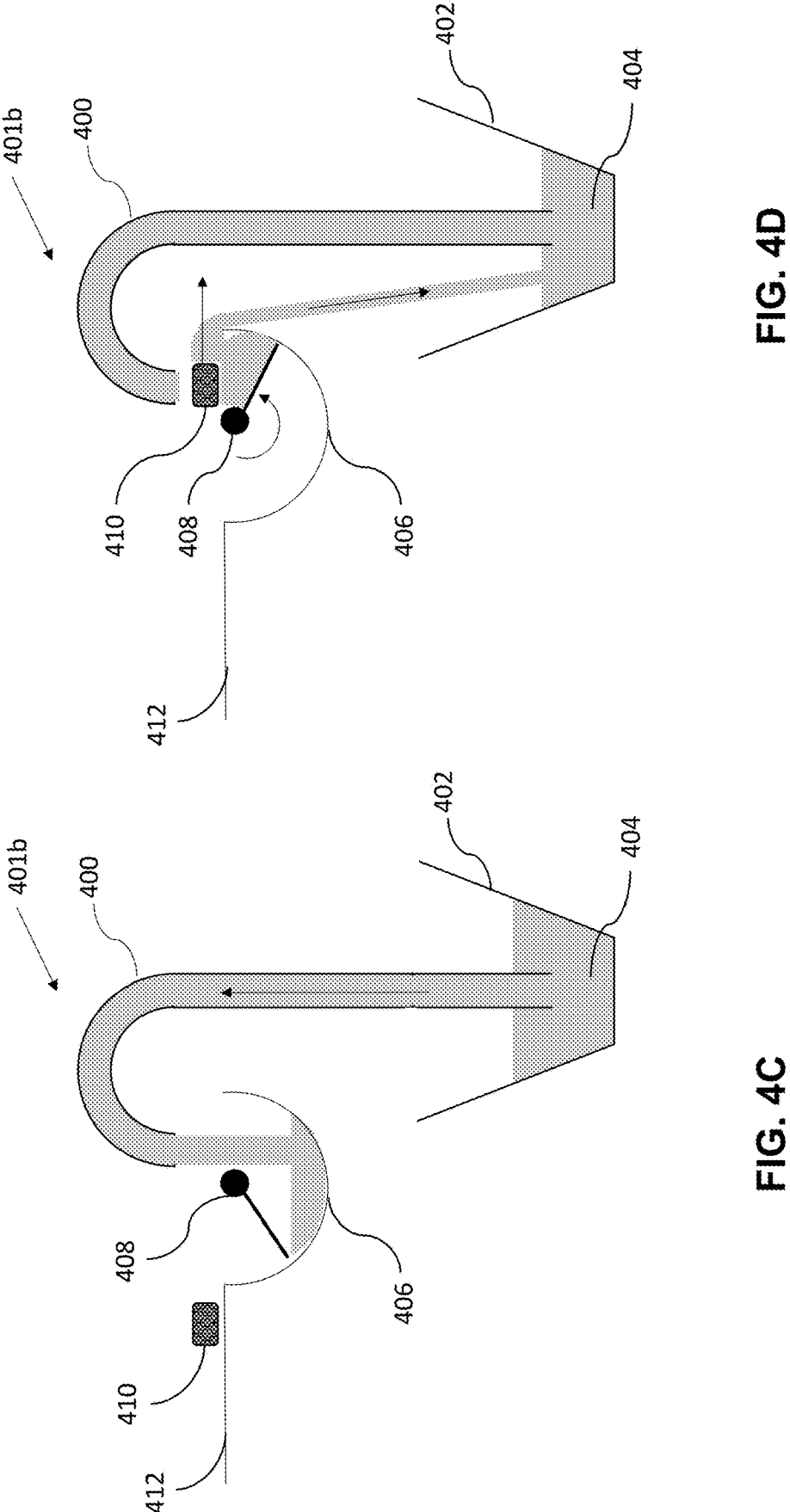

FIGS. 4C-4D show a mechanism for regulating the amount of powder inside the trough 406 different to that of FIGS. 4A-4B. Instead of relying on an overflow port as shown in FIGS. 4A-4B, in system 401b shown in FIGS. 4C-4D, the flipper 408 is configured to move to a predetermined position (e.g., a preset angle), and the recoater 410 is configured to move laterally above the trough 406 and to push the extraneous powder 404 (which is pushed above by the flipper 408 at the predetermined position) into the hopper 404, located below the trough 406. This allows for metering of the desired amount of powder by selecting an appropriate position for the flipper so that the volume left between the flipper and the lower edge of the recoated represents the desired amount of powder.

For example, when the screw conveyor 400 first starts to fill the trough 406, the flipper 408 is placed at a first position. After the screw conveyor 400 delivers a predetermined amount of powder 404 into the trough 406, the flipper 408 then moves to a second position. The recoater 410 then moves across the top of the trough 406, pushing extraneous powder 404 back into the hopper 402. The flipper 408 then moves to a new position to prepare for powder recoating. The first position, the amount of powder delivered by the screw conveyor 400 in each cycle, and the second position, and the geometry of the trough 406, together determine the amount of powder to remain inside the trough 406 after each powder delivery cycle.

One advantage of the powder regulating mechanism described in FIGS. 4C-4D is that the amount of powder in the trough 406 can be dynamically programmed. For example, to increase the amount of powder inside the trough 406, the second position of the flipper 408 can be selected so a smaller amount of powder 404 is pushed above the trough 402, or the first position of the flipper 408 can be changed to accommodate more powder to be delivered into the trough 406.

Figure 4E:
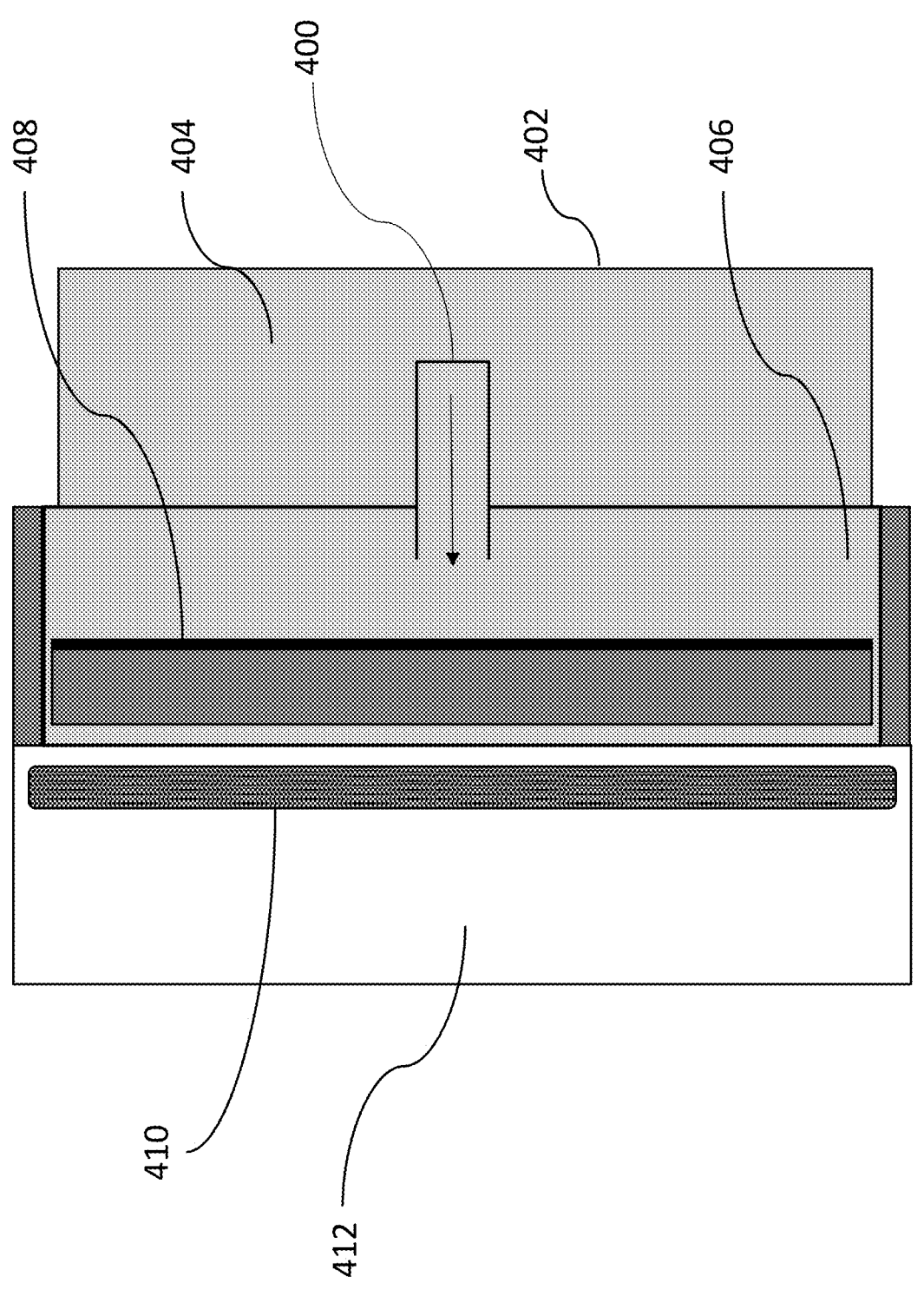

FIG. 4E shows a plan view of system 401a and 401b described in relation to FIGS. 4A-4D.

FIGS. 5A-5D depict a second illustrative powder delivery and regulating system for an SLS additive fabrication device, according to some embodiments. The powder delivery and regulating system described in FIGS. 5A-5D is similar to that described in FIGS. 4C-4D, but the screw conveyor 500 (e.g., a flexible screw conveyor) is attached to the hopper 502 using a different configuration.

In the example of FIGS. 5A-5D, the screw conveyor 500 is communicably coupled to the hopper 502 with an powder intake opening 506 placed below the hopper 502 (e.g., below a bottom opening of the hopper 502). Either or both ends (e.g., ends 508a or 508b) of the screw conveyor 500 can be coupled to one or more actuators that can be operated to rotate the screw conveyor 500, which may allow for more architectural flexibility comparing to the system shown in FIGS. 4A-4E. Further, since the intake opening 506 is placed below the powder 504, the weight of the powder 504 may allow for more efficient powder intake into the screw conveyor 500. The screw conveyor may, in some implementations, comprise a flexible screw as described above, allowing the screw to be present in both straight sections of the screw conveyor shown in the drawing (that is, both in the straight section directly below the hopper and in the straight sloped section connected to the trough).

Figures 5A, 5B:
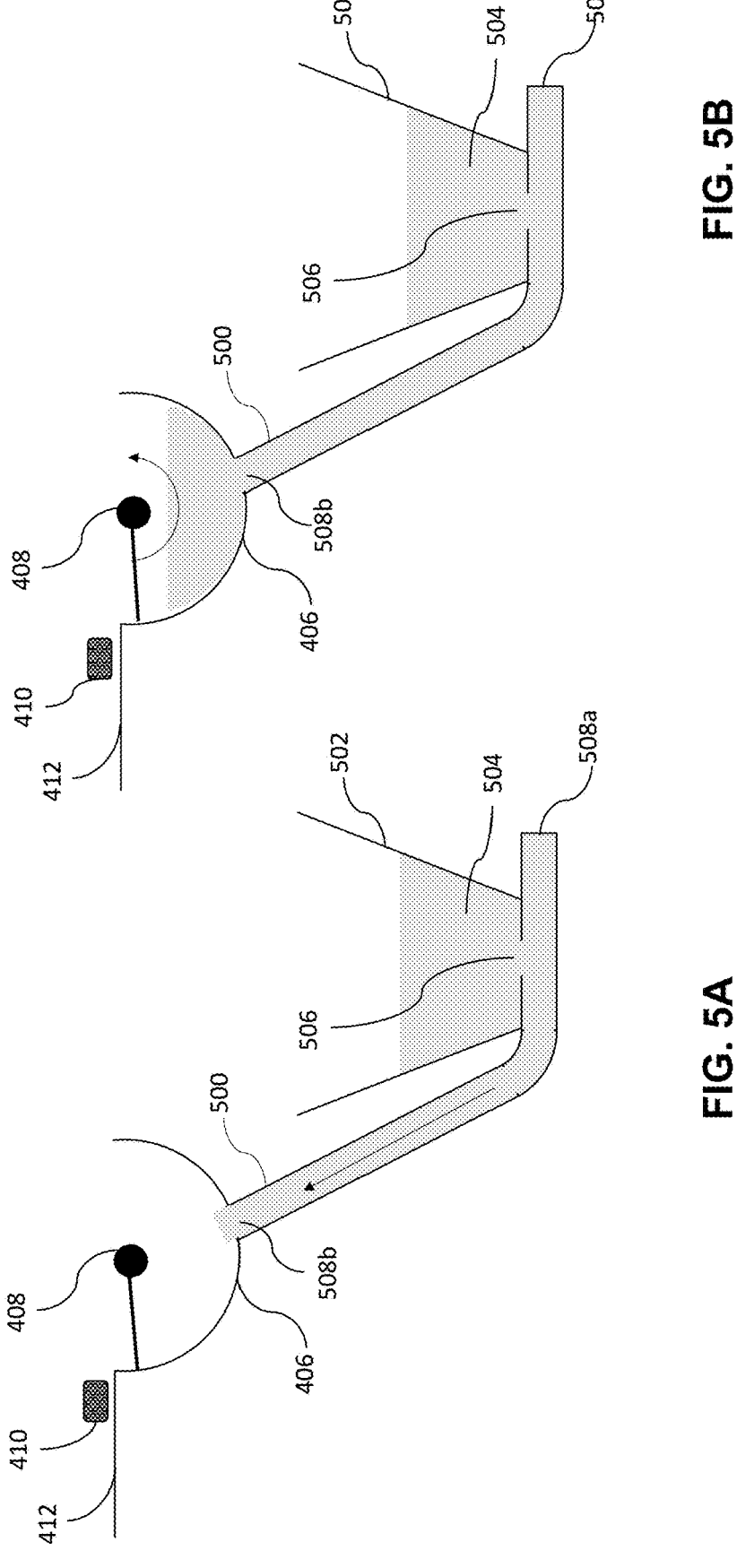
FIGS. 5A-5D depict a second illustrative powder delivery and regulating system for an SLS additive fabrication device, according to some embodiments.
Figures 5C, 5D:
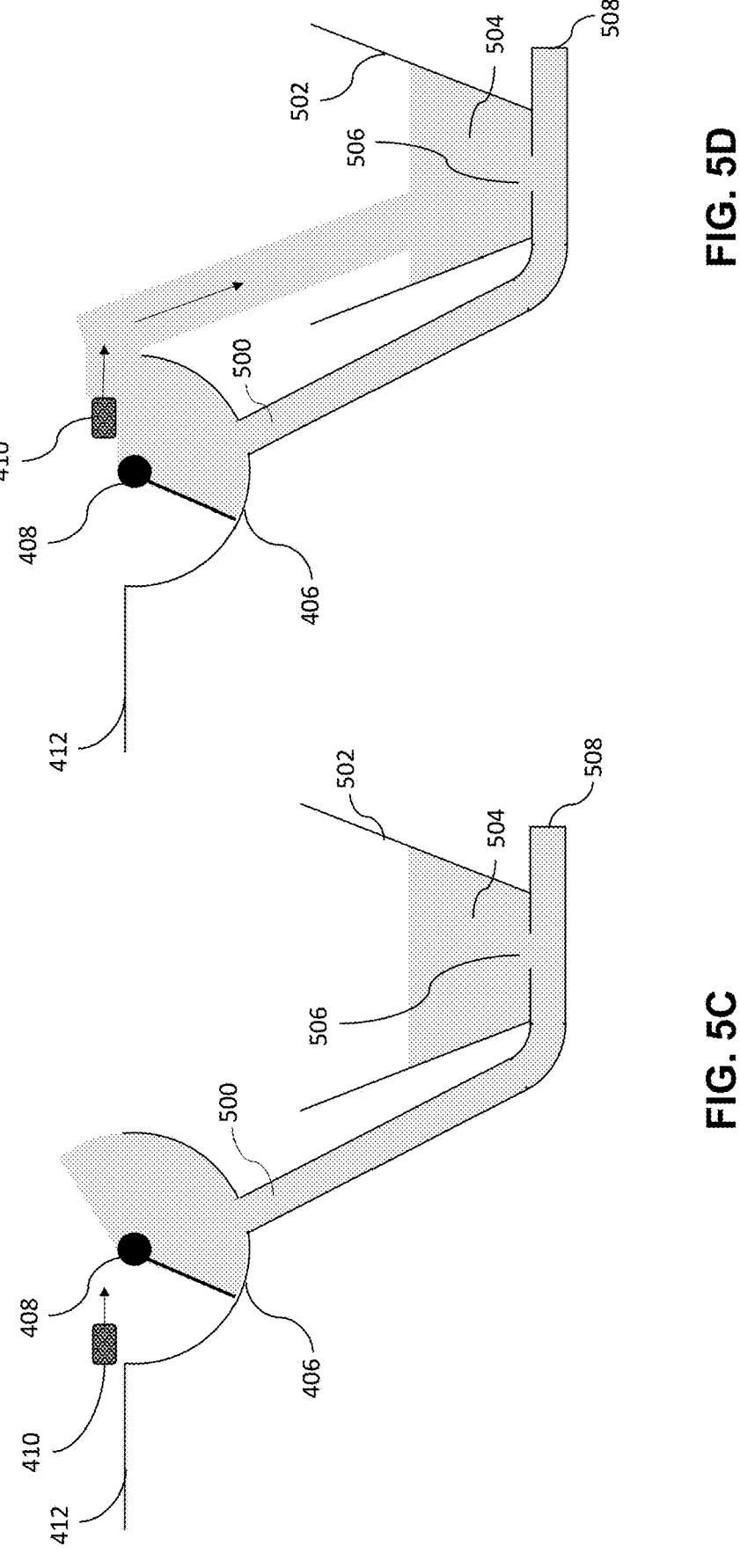

In operation, the system shown in FIGS. 5A-5D operates by operating the screw conveyor 500 as described above to convey powder from the hopper. As shown in FIG. 5B, the trough may begin to fill with powder as a result. To meter the desired volume of powder for delivery to the build platform 412, the flipper 408 is moved away from the build platform and towards the opening of the screw conveyor, thereby pushing some powder above the top of the trough, as shown in FIG. 5C. The recoater 410 then is moved over the top of the trough to push excess powder off the side of the trough and into the hopper 502.

In some embodiments not shown in FIGS. 5A-5D, the trough 406 can be configured to include an outflow port similar to the outflow port 414 for regulating the amount of powder inside the trough 406.

Figures 6A, 6B:
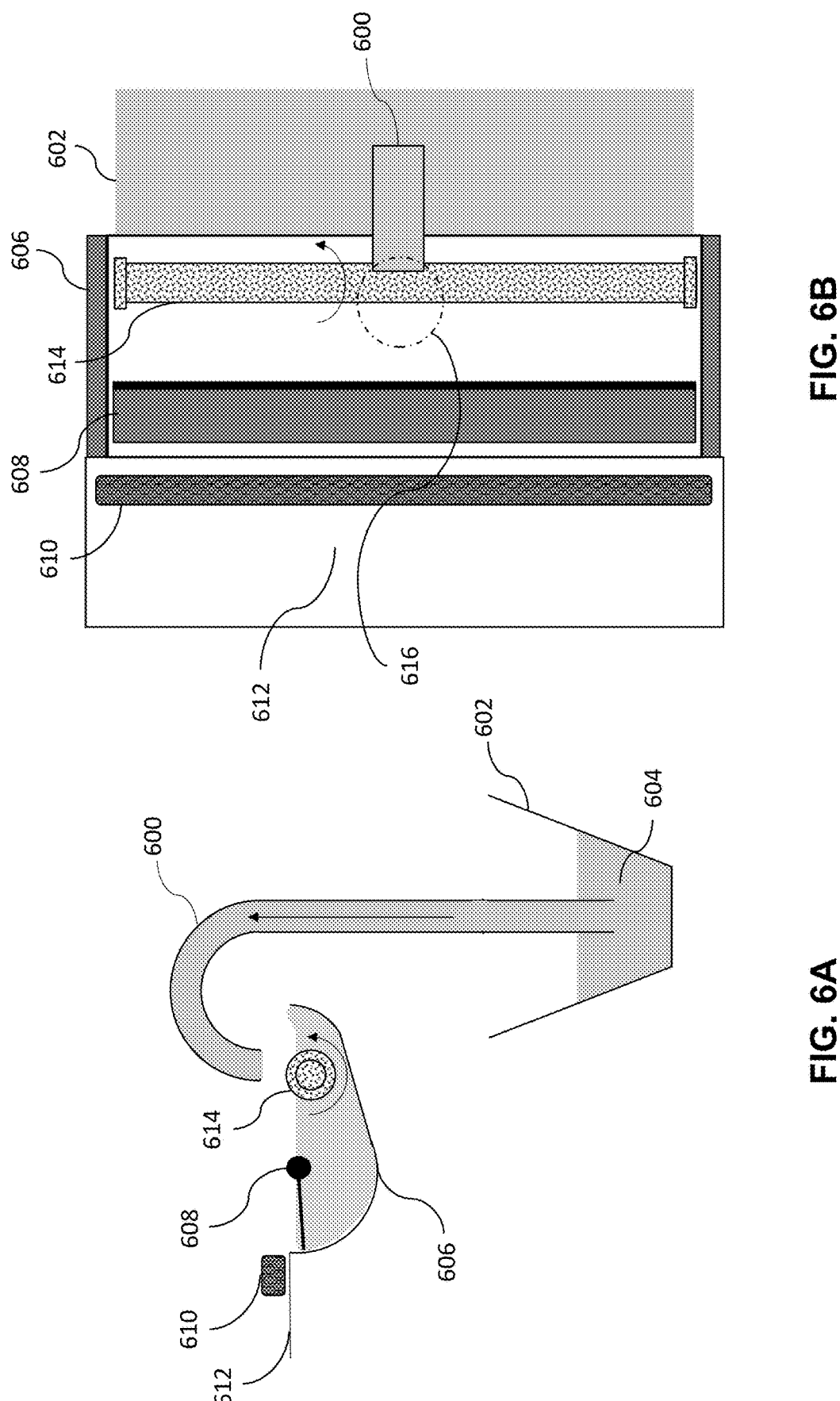
FIGS. 6A-6C depict an illustrative powder delivery and regulating system with a spreader, according to some embodiments.
Figure 6C:
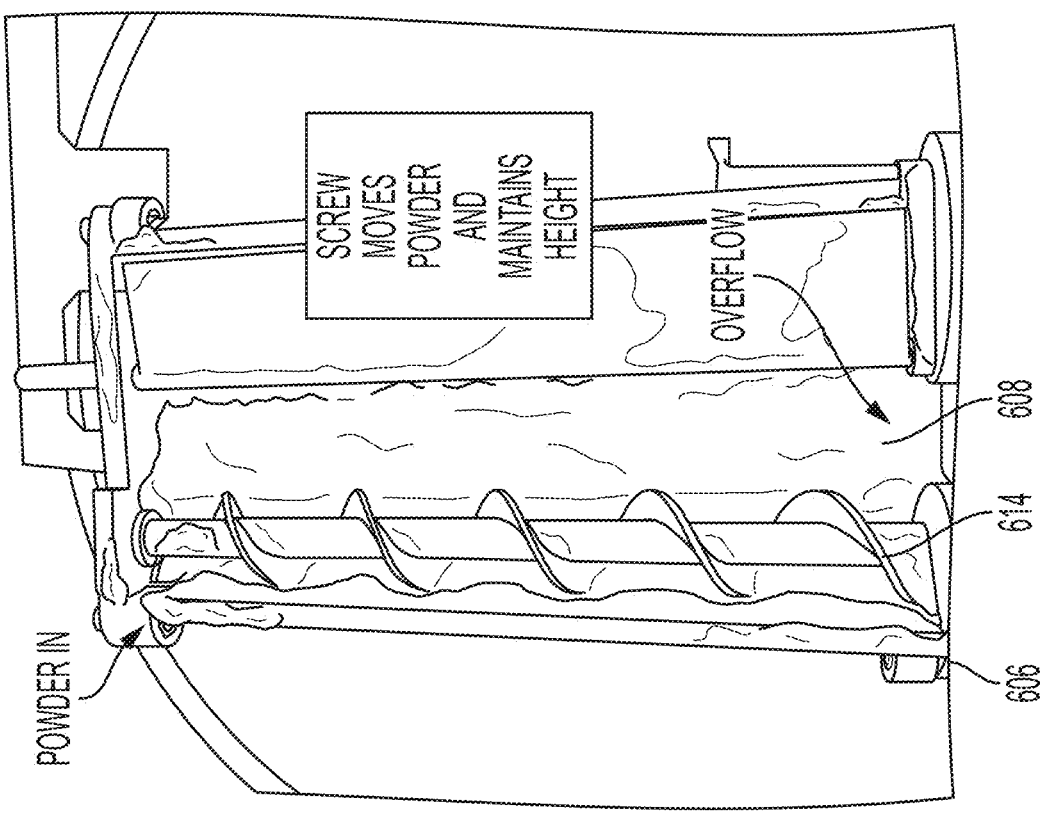

FIGS. 6A-6C depict an illustrative powder delivery and regulating system with a spreader 614, according to some embodiments. The screw conveyor 600 is for illustrative purposes only, and in practice, can be implemented as the system shown in FIGS. 4A-4E or the system shown in 5A-5D.

In some cases, one challenge with filling the trough 606 with a screw conveyor 600 is that the powder 604 leaving the screw conveyor tends to accumulate in a region 616 proximate to the end of the screw conveyor 600. As a result, the trough 606 may not be evenly filled before the regulating mechanism starts to operate. The spreader 614 include a screw (e.g., as shown in FIG. 6C) mounted within the trough 606, and/or any other suitable structure that may be actuated to distribute powder within the trough. The spreader 614 may be actuated to rotate, thereby spreading powder 604 evenly across the entire space of the trough 606.

Figures 7A, 7B:
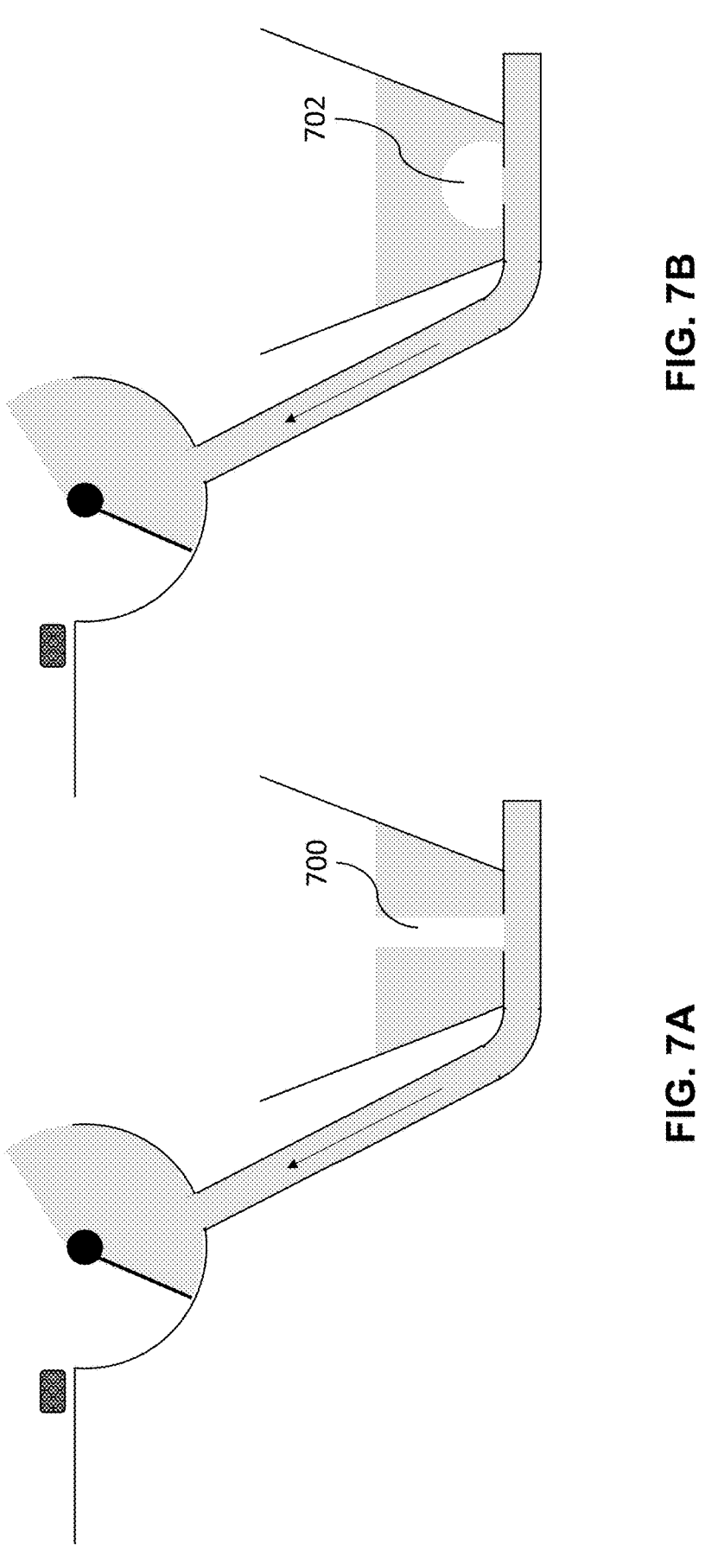
FIGS. 7A-7C depict an illustrative powder delivery and regulating system with an agitator, according to some embodiments.
Figure 7C:
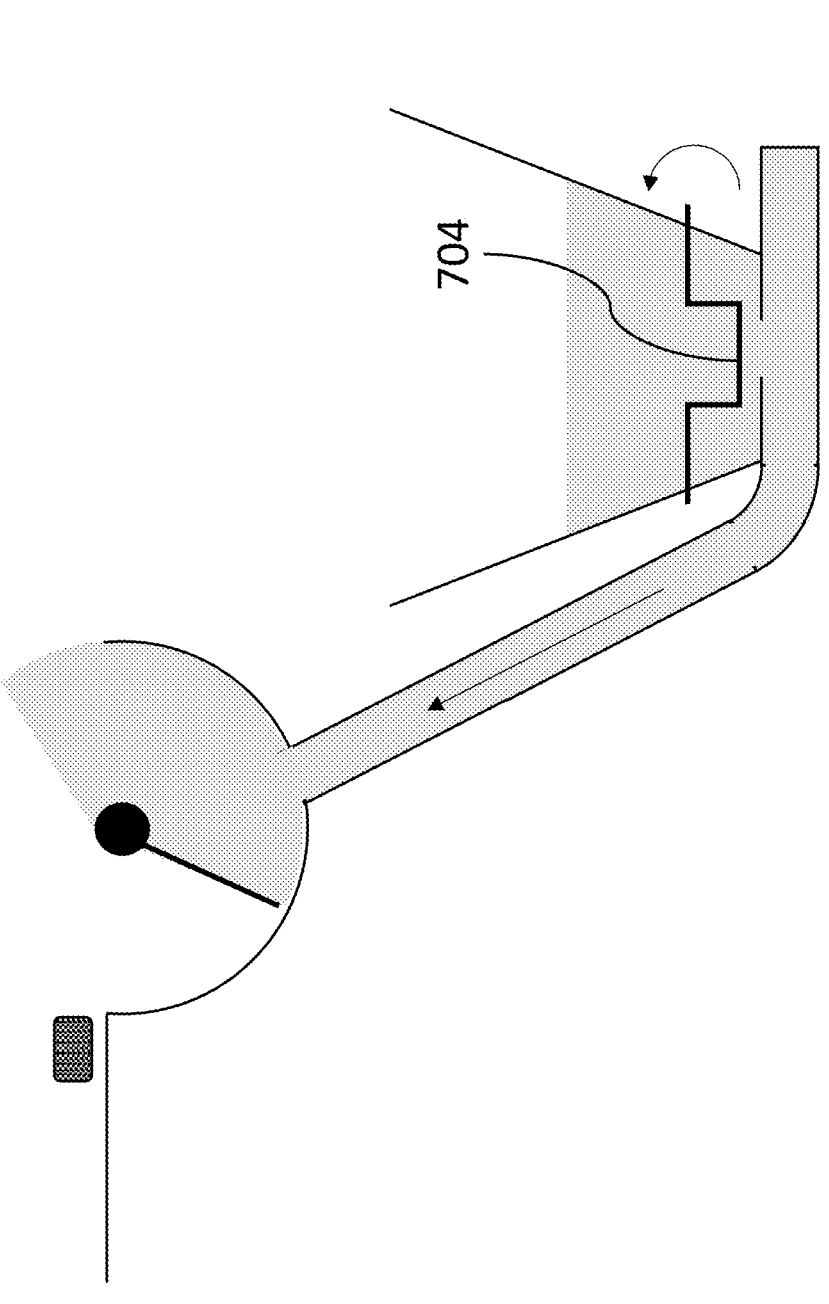

FIGS. 7A-7B depict an illustrative powder delivery and regulating system, and FIG. 7C depicts an illustrative powder delivery and regulating system comprising an agitator, according to some embodiments. Either or both of two issues may occur when a screw conveyor is installed below the powder hopper (e.g., as shown in FIGS. 5A-5D, 7A-7B). In some cases, particle-to-particle friction within the powder may create a vertical hole 700 (also known as a 'rathole') above the intake opening of the screw conveyor, as shown in FIG. 7A. As a result, despite having powder in the hopper, the powder delivery system cannot feed additional powder into the screw conveyor. In some cases, a cavity 702 (also known as 'bridging') can form above the intake opening of the screw conveyor, as shown in FIG. 7B. The tension within the powder may create an 'arch bridge' that encloses the cavity. Similar to the 'rathole' in FIG. 7A, powder can no longer be fed into the screw conveyor when a cavity forms.

To address these problems and produce a continuous flow of powder, an agitator 704 may be arranged within the hopper and configured to stir the powder within the hopper. As shown in FIG. 7C, an agitator 704 may be placed directly above the intake opening of the screw conveyor, and may be coupled to one or more actuators (e.g., motors) to rotate the agitator within the hopper. As a result, powder inside the hopper may be stirred, continuously or otherwise, to prevent holes or bridges from forming within the hopper.

Additionally, or alternatively to the agitator, the hopper may comprise a mechanical vibrator that may be operated to shake powder inside the hopper to break any particle-to-particle bonds. Alternatively or additionally, one or more sources of compressed air may be arranged within the powder and operated to fluidize the powder inside the hopper.

Figure 8B:
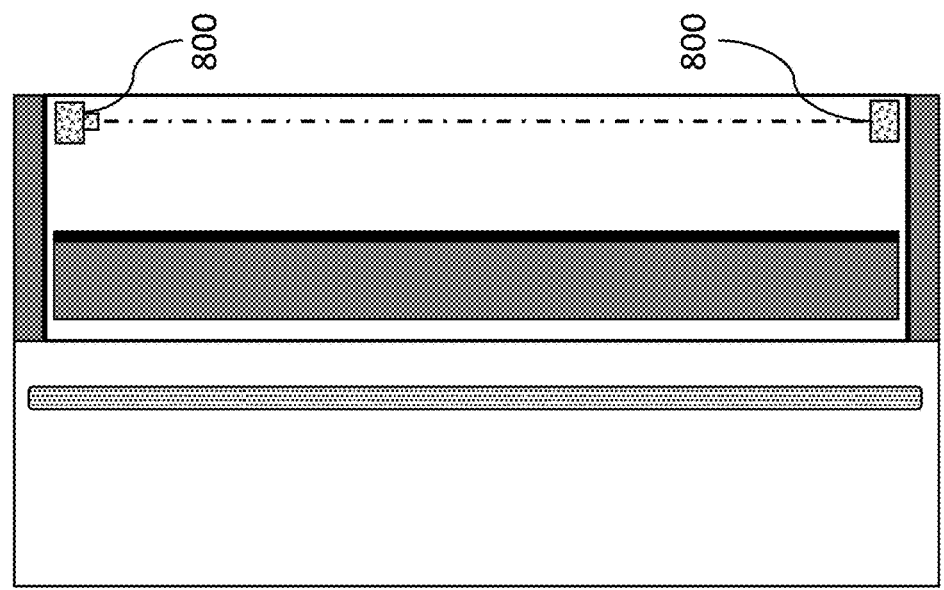
FIGS. 8A-8B depicts a third illustrative powder delivery and regulating system, according to some embodiments.
Figure 8A:
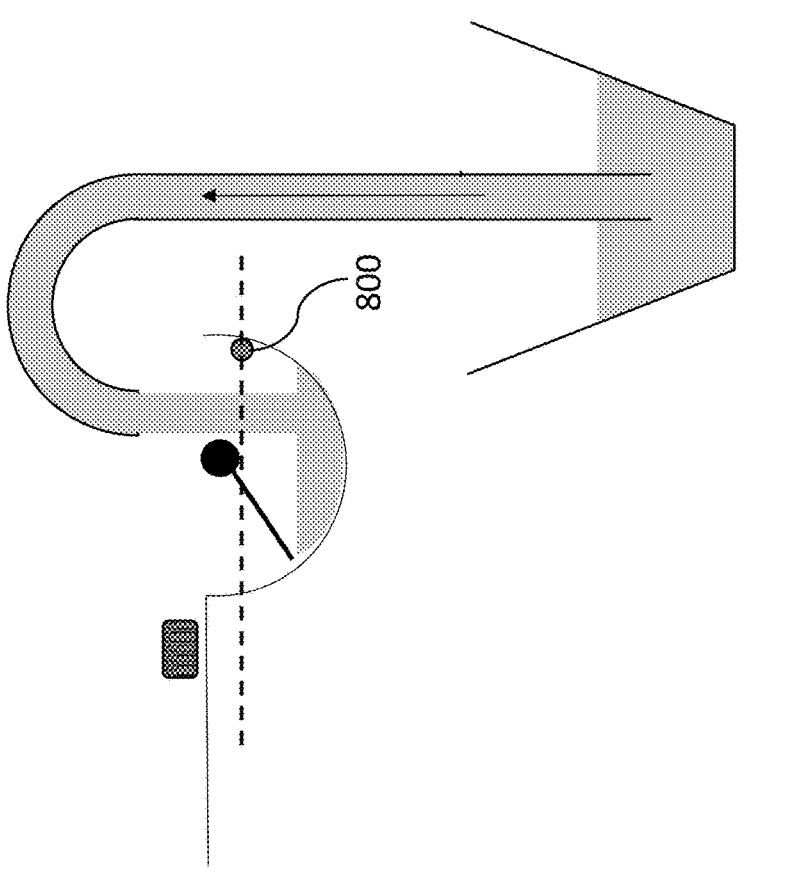

FIGS. 8A-8B depicts a third illustrative powder delivery and regulating system, according to some embodiments. In FIGS. 8A-8B, an electro-optical sensing system 800 is mounted in the trough of the powder delivery and regulating system. For example, the electro-optical sensing system 800 includes position sensors or photoelectric sensors that detect a level of the powder inside the trough. The screw conveyor is configured to feed powder into the trough, and configured to pause when the powder reaches a height that triggers the position electro-optical sensing system 800. In some embodiments, the mounting position of the electro-optical sensing system 800 inside the trough can be adjusted to control the level of powder inside the trough. For example, to allow more powder stored in the trough, the electro-optical sensing system can be moved to a higher position in the trough. To prevent interference from the flipper, the electro-optical sensing system may be placed outside the rotating range of the flipper. Alternatively, other types of beam-breaking sensors can be used in place of the electro-optical sensing system, such as ultrasonic sensors to produce signals having one of two power-levels (e.g., one for when the beam path is blocked, and the other one for when the beam path is unblocked).

In some embodiments, the electro-optical sensor includes a parallel axis/beam-break sensor configuration, and/or the electro-optical sensor is placed above the powder in the trough.

Figure 9:
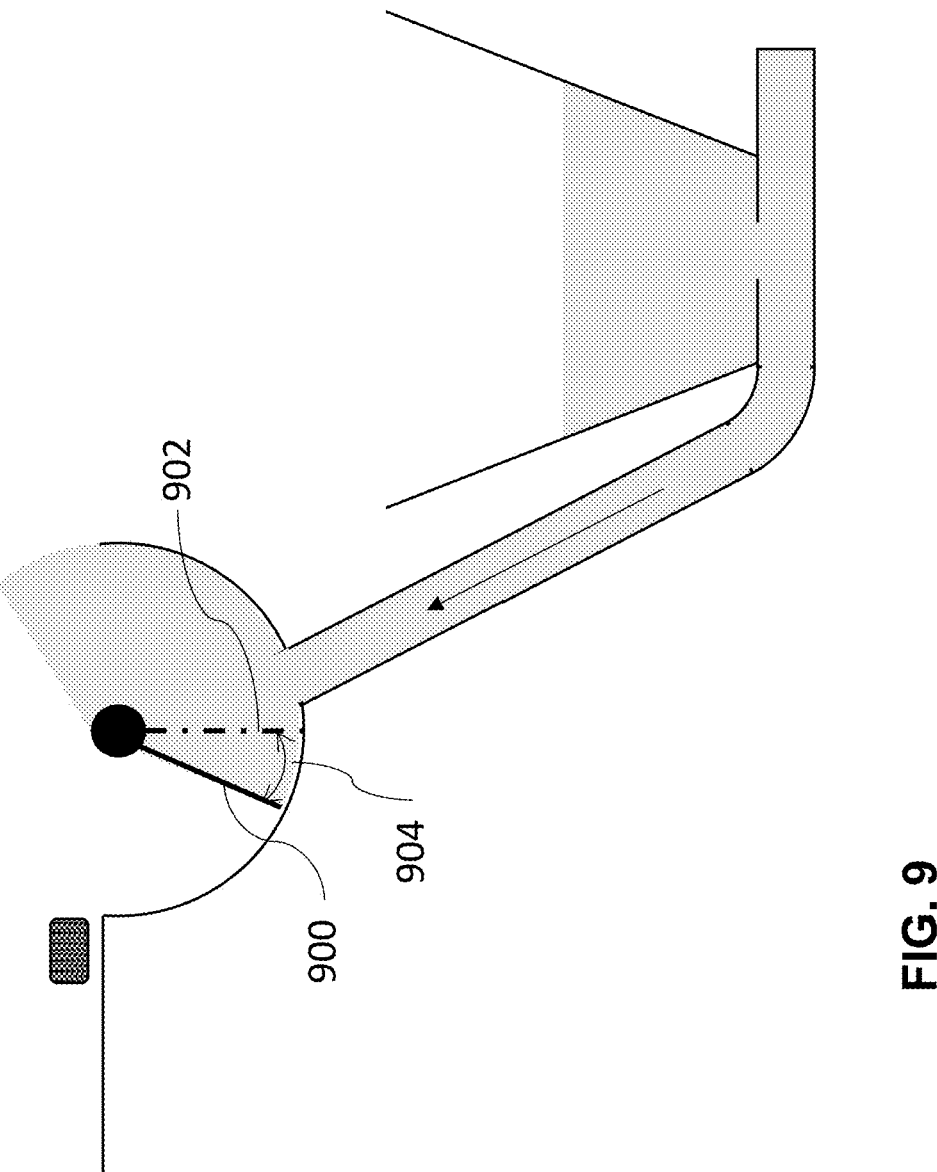
FIG. 9 depicts a fourth illustrative powder delivery and regulating system, according to some embodiments.

FIG. 9 depicts a fourth illustrative powder delivery and regulating system, according to some embodiments. In FIG. 9, the system is configured to determine the amount of powder in the trough based on a measured difference between planned flipper position 902 and detected flipper position 900. As the flipper pushes the powder inside the trough, the flipper also experiences a resistance from the powder. The resistance is proportional to the amount of powder stored inside the trough. When the resistance is greater than the power of the flipper, the flipper becomes "jammed" and the true flipper position 900 is offset from the planned flipper position 902, by an angle 904. By calculating the angle 904 as well as the power of the flipper, a suitable controller (e.g., a processor within the SLS system that comprises the powder delivery and regulating system) can determine the resistance force and estimate the amount of powder in the trough. For instance, one or more controllers may receive sensor data indicating a position of the flipper (e.g., angular position) and may calculate, based on the received sensor data and the known power of the flipper, a resistance force being experienced by the flipper. An amount of powder in the trough may then be determined based on the calculated resistance force. Alternatively, the one or more controllers may directly determine the amount of powder in the trough based on the received sensor data and the known power of the flipper without first calculating the resistance force.

In some embodiments, the flipper is connected to a force sensor configured to measure the resistance force applied to the flipper. In some embodiments, an input and/or output signal supplied to an actuator operating the flipper may be measured to estimate the resistance applied to the flipper (e.g., the back EMF on a motor may be measured and used as an indication of the resistance encountered by the flipper).

Figure 10:
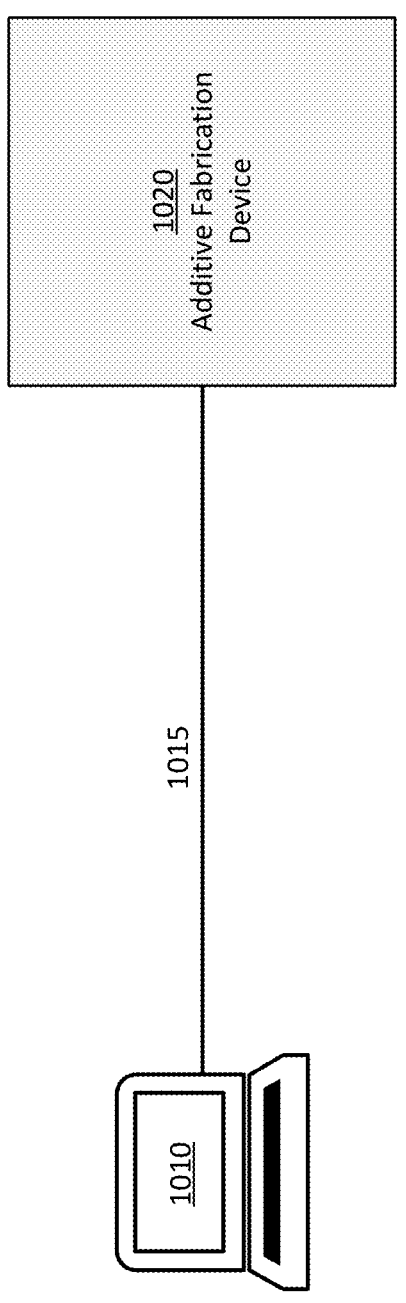
FIG. 10 is a block diagram of a system suitable for practicing aspects of the invention, according to some embodiments.
Figure 10:

FIG. 10 is a block diagram of a system suitable for practicing aspects of the invention, according to some embodiments. System 1000 illustrates a system suitable for generating instructions to perform additive fabrication by a device comprising a powder delivery apparatus, and subsequent operation of the additive fabrication device to fabricate an object. For instance, instructions to fabricate the object using an additive fabrication system may comprise instructions to operate a powder deposition mechanism. In some cases, the instructions may also, when executed by the additive fabrication device, cause the additive fabrication device to operate an energy source in concert with the powder deposition mechanism.

According to some embodiments, computer system 1010 may execute software that generates two-dimensional layers that may each comprise sections of the object. Instructions may then be generated from this layer data to be provided to an additive fabrication device, such as additive fabrication device 1020, that, when executed by the device, fabricates the layers and thereby fabricates the object. Such instructions may be communicated via link 1015, which may comprise any suitable wired and/or wireless communications connection. In some embodiments, a single housing holds the computing device 1010 and additive fabrication device 1020 such that the link 1015 is an internal link connecting two modules within the housing of system 1000.

Figures 11A, 11B, 11C:
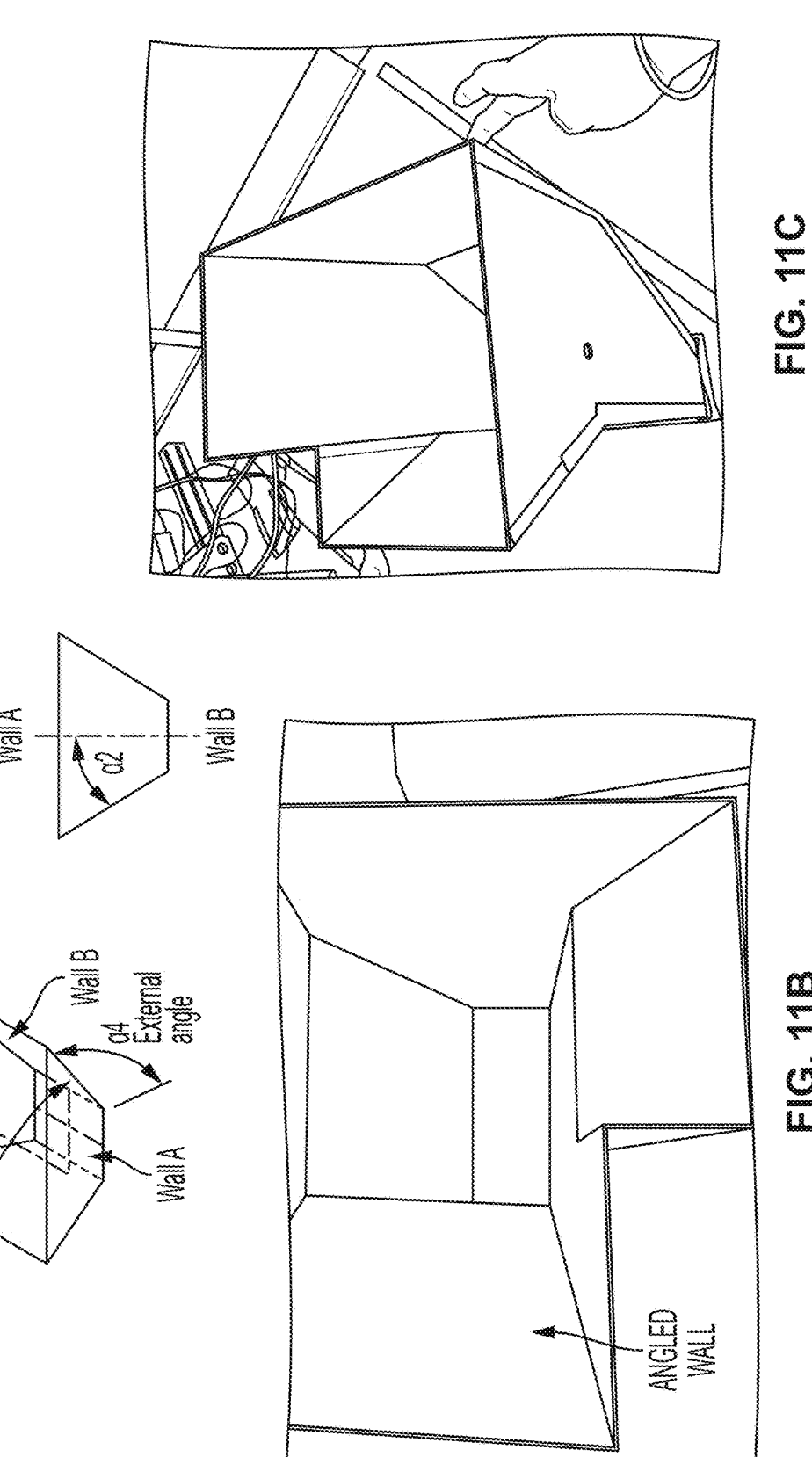
FIGS. 11A-11C illustrate a design of the hopper for mitigating powder bridging, according to some embodiments.

FIGS. 11A-11C illustrate a design of the hopper for mitigating powder bridging, according to some embodiments. In some embodiments, one problem that can occur is that even if the side walls of a hopper are at a steep angle for powder to slide off, the "valley angle" (i.e., the angle at which two angled walls meet) may not be as steep, leading to powder accumulating in the area where the walls meet (see FIG. 11A). One solution is to have the corner of the hopper inverted so that the hopper can include two angled walls and no valley angle, as shown in FIG. 11B. Alternatively, the hopper shown in FIG. 11C includes adjacent sides that each includes an angled portion. As a result, shallow walls without the issue of powder bridging can be joined at predetermined angles (e.g., valley angle).

Figure 12:
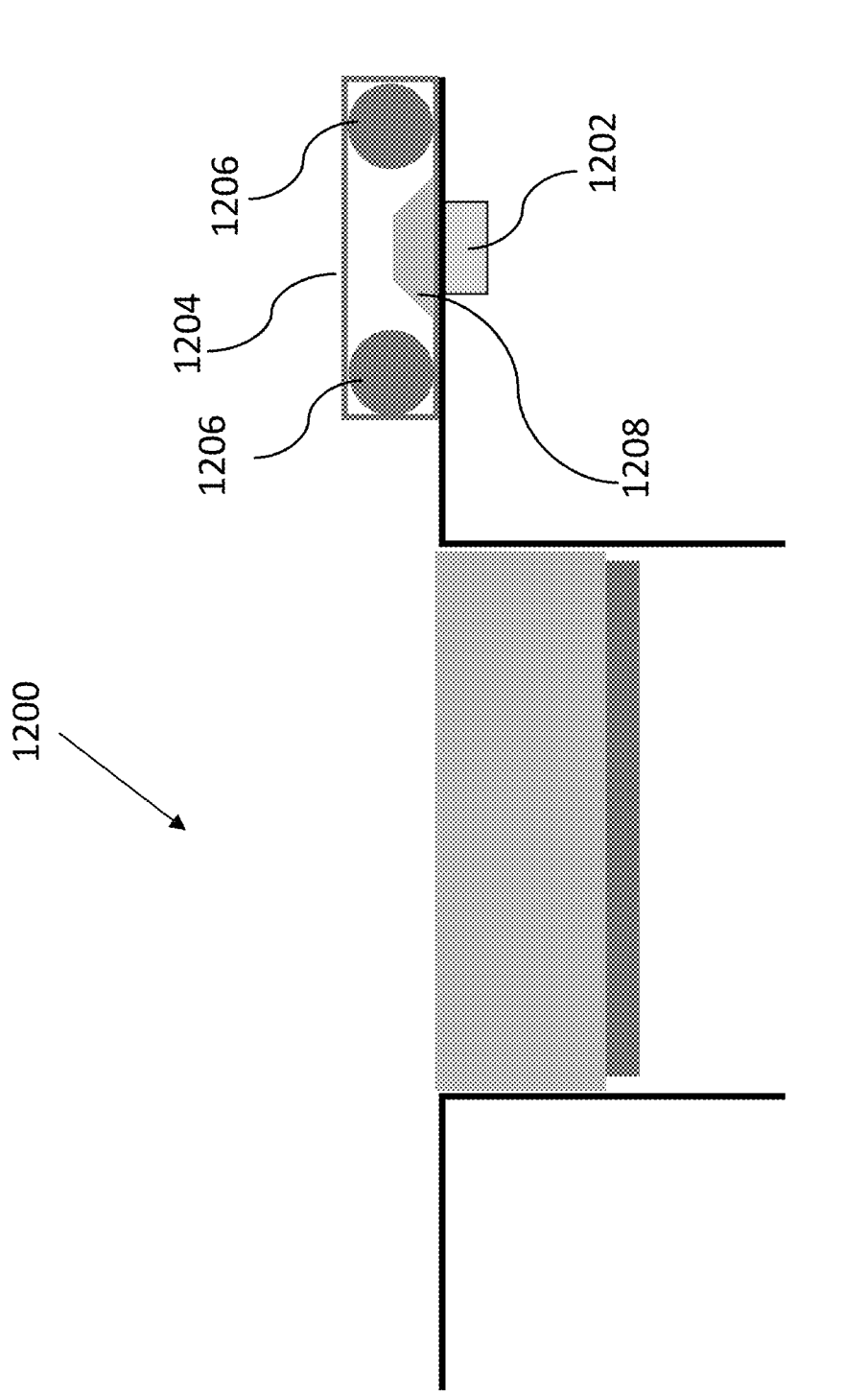
FIG. 12 depicts a fourth illustrative powder delivery and regulating system, according to some embodiments.

FIG. 12 depicts a fourth illustrative powder delivery and regulating system 1200, according to some embodiments. The system 1200 includes a hopper (not shown) for storing powder, but does not include a trough. Instead, recoater 1204 includes two segments 1206 defining a powder volume between the two segments for storing a portion of the powder from the hopper, and for spreading the powder across the build platform. A measuring sensor 1202 such as a weight sensor is placed below the recoater 1204 to measure the amount of powder stored in the recoater 1204. A powder transfer device such as a screw feed device (shown in FIGS. 3A-3B), and/or an air assisted device (vacuum or positive air pressure) can be used to transfer powder from the hopper to the recoater 1204. Alternatively or optionally, other types of measuring sensors such as a beam-break sensor can be mounted inside recoater 1204 to measure the amount of powder, or a distance measuring sensor can be placed on top of the recoater 1204 and facing downward to measure the amount of powder inside the recoater 1204.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Various aspects of the present invention may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

According to some aspects, a powder delivery apparatus for an additive fabrication system is provided, the powder delivery apparatus comprising a hopper configured to hold a powder, a trough adjacent to a build area of the additive fabrication system and connected to the hopper to receive the powder, a regulating device configured to self-rotate around a first axis to deliver powder from the trough to the build area of the additive fabrication system, an electro-optical sensor for measuring a level of the powder in the trough, and a processor configured to control a motion of the regulating device based on a measured level of the powder in the trough, thereby maintaining a constant level of powder in the trough.

According to some embodiments, the electro-optical sensor is affixed to a side of the trough, and producing an optical sensing path significantly parallel to the first axis and outside of the range of self-rotation motion of the regulating device.

According to some embodiments, the electro-optical sensor includes a parallel axis/beam-break sensor configuration.

According to some embodiments, the electro-optical sensor is placed above the powder in the trough.

According to some aspects, a powder delivery apparatus for an additive fabrication system, the powder delivery apparatus comprising a hopper configured to hold a powder, a trough adjacent to a build area of the additive fabrication system, a regulating device configured to deliver powder from the trough to the build area of the additive fabrication system, and a powder feeding device for delivering powder from the hopper to the trough, wherein the hopper is situated below the trough and configured to receive powder overflowing from the trough.

According to some embodiments, the powder feeding device includes a flexible screw conveyor.

According to some aspects, a powder delivery apparatus for an additive fabrication system, the powder delivery apparatus comprising a hopper configured to hold a powder, a trough adjacent to a build area of the additive fabrication system and connected to the hopper to receive the powder, a regulating device configured to deliver powder in the trough to the build area of the additive fabrication system, and a processor for measuring a level of powder in the trough by measuring force feedback returned by the regulating device.

According to some aspects, a powder delivery apparatus for an additive fabrication system is provided, the powder delivery apparatus comprising a hopper configured to hold a powder, a recoater including two segments, configured to enclose a powder volume between the two segments, a powder transfer mechanism for moving powder from the hopper to the recoater, and a sensor to measure an amount of volume enclosed between the two segments.

According to some embodiments, the wherein the two segments are rollers and/or blades.

According to some embodiments, the powder transfer mechanism includes a screw feed device, a vacuum feed device, and/or a positive pressure feed device.

According to some embodiments, the sensor includes a weight sensor positioned below the recoater, a beam-break style sensor placed across the powder volume, and/or a distance measuring sensor placed above the powder volume.

According to some embodiments, the two adjacent sides of the hopper each includes an angled portion on the respective sides, therefore allowing shallow walls.

According to some embodiments, the hopper includes an agitating device placed within the interior of the hopper, and configured to self-rotate to stir powder.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A powder delivery apparatus for an additive fabrication system, the powder delivery apparatus comprising:
    a hopper configured to hold a powder;
    a trough adjacent to a build area of the additive fabrication system and configured to receive powder from the hopper, wherein the hopper is arranged to receive powder overflowing from the trough into the hopper;
    a powder conveyor arranged at least partially within the hopper and configured to convey powder from the hopper into the trough;
    an electro-optical sensor configured to produce at least one signal indicative of a level of the powder in the trough; and
    at least one processor configured to control motion of the powder conveyor based on the at least one signal produced by the electro-optical sensor to control the level of the powder in the trough.

2. The powder delivery apparatus of claim 1, wherein the electro-optical sensor is affixed to at least one interior side of the trough, and is configured to produce an optical sensing path across opposing sides of the trough.

3. The powder delivery apparatus of claim 1, wherein the electro-optical sensor includes a parallel axis/beam-break sensor configuration.

4. The powder delivery apparatus of claim 1, wherein the hopper comprises an agitating device placed within the interior of the hopper that is configured to rotate to distribute the powder within the hopper.

5. The powder delivery apparatus of claim 1, wherein the powder conveyor comprises a screw conveyor.

6. The powder delivery apparatus of claim 5, wherein the screw conveyor is at least partially arranged beneath the hopper.

7. The powder delivery apparatus of claim 5, wherein the screw conveyor comprises a first section coupled to an underside of the trough.

8. The powder delivery apparatus of claim 5, wherein the hopper is arranged below the trough.

9. The powder delivery apparatus of claim 1, wherein the electro-optical sensor is placed above the powder in the trough.

10. A powder delivery apparatus for an additive fabrication system, the powder delivery apparatus comprising:
    a hopper configured to hold a powder;
    a trough adjacent to a build area of the additive fabrication system and arranged above the hopper, wherein the hopper is arranged to receive powder overflowing from the trough into the hopper;
    a regulating device configured to deliver powder from the trough to the build area of the additive fabrication system; and
    a powder conveyor arranged at least partially within the hopper and configured to convey powder from the hopper into the trough.

11. The powder delivery apparatus of claim 10, wherein the powder conveyor includes a screw conveyor.

12. The powder delivery apparatus of claim 11, wherein the screw conveyor is at least partially arranged beneath the hopper.

13. The powder delivery apparatus of claim 11, wherein the screw conveyor comprises a first section coupled to an underside of the trough.

14. The powder delivery apparatus of claim 11, wherein the hopper is arranged below an overflow port of the trough.

15. The powder delivery apparatus of claim 10, wherein an edge of the trough is positioned directly above the hopper.

16. The powder delivery apparatus of claim 10, wherein the hopper comprises an agitating device placed within the interior of the hopper that is configured to rotate to distribute the powder within the hopper.

17. A powder delivery apparatus for an additive fabrication system, the powder delivery apparatus comprising:
    a hopper configured to hold a powder;
    a trough adjacent to a build area of the additive fabrication system and configured to receive powder from the hopper, wherein the hopper is arranged to receive powder overflowing from the trough into the hopper;
    a regulating device configured to deliver powder in the trough to the build area of the additive fabrication system; and
    at least one processor configured to measure a level of powder in the trough by measuring a force applied to the regulating device during its motion through the trough.

18. The powder delivery apparatus of claim 17, further comprising a force sensor configured to measure a resistance force applied to the regulating device.

19. The powder delivery apparatus of claim 18, wherein the at least one processor is configured to measure the level of powder in the trough by calculating the level of powder based on one or more sensor readings received from the force sensor.

20. The powder delivery apparatus of claim 17, wherein the at least one processor is configured to measure the level of powder in the trough by calculating the level of powder based on a measurement of back electromotive force (EMF) applied to the regulating device.

* * * * *